United States Patent
Sarukkai et al.

(10) Patent No.: US 12,278,729 B2
(45) Date of Patent: Apr. 15, 2025

(54) SYSTEMS, METHODS, AND MEDIA FOR MONITORING CLOUD CONFIGURATION SETTINGS

(71) Applicant: Skyhigh Security LLC, Plano, TX (US)

(72) Inventors: Sekhar Sarukkai, Cupertino, CA (US); Prasad Raghavendra Somasamudram, Bangalore (IN); Syed Ummar Farooqh, Bangalore (IN)

(73) Assignee: Skyhigh Security LLC, Plano, TX (US)

( * ) Notice: Subject to any disclaimer, the term of this patent is extended or adjusted under 35 U.S.C. 154(b) by 15 days.

(21) Appl. No.: 17/188,243

(22) Filed: Mar. 1, 2021

(65) Prior Publication Data
US 2022/0029882 A1   Jan. 27, 2022

(30) Foreign Application Priority Data
Jul. 24, 2020 (IN) .............................. 202011031723

(51) Int. Cl.
*H04L 12/24* (2006.01)
*H04L 41/08* (2022.01)
*H04L 41/0816* (2022.01)
*H04L 41/0866* (2022.01)
*H04L 41/0893* (2022.01)

(52) U.S. Cl.
CPC ...... *H04L 41/0866* (2013.01); *H04L 41/0816* (2013.01); *H04L 41/0886* (2013.01); *H04L 41/0893* (2013.01)

(58) Field of Classification Search
CPC ............ H04L 41/0816; H04L 41/0893; H04L 41/0886; H04L 41/06; H04L 63/20; H04L 63/1408; H04L 63/145; H04L 63/1433; H04L 63/0227; H04L 63/1416; H04L 63/10; H04L 63/107; G06F 21/577; G06F 16/128; G06F 16/285; G06N 5/022
See application file for complete search history.

(56) References Cited

U.S. PATENT DOCUMENTS

| | | | |
|---|---|---|---|
| 10,949,543 B1* | 3/2021 | Bolukbas | G06F 21/577 |
| 2015/0215332 A1* | 7/2015 | Curcic | H04L 63/20 726/25 |
| 2015/0319185 A1* | 11/2015 | Kirti | H04L 63/1416 726/23 |

(Continued)

*Primary Examiner* — Dustin Nguyen
(74) *Attorney, Agent, or Firm* — Byrne Poh LLP

(57) ABSTRACT

Receiving configuration settings (CSs) from a resource using an API; determining a resource risk score (RERS), a first tactic risk score (TARS), a first plurality of technique risk scores (TERSs), a second TARS, and a second TERSs, wherein the RERS is based on the first TARS and the second TARS, wherein the first TARS is based on the first TERSs, wherein the second TARS is based on the second TERSs, wherein each of the first TERSs is based on a subset of a set of policy scores (SPS), wherein each of the second TERSs is based on a subset of the SPS, and wherein each of the SPS is based on compliance of the CSs with a setting; and selecting a most-important technique (MIT) based on the first TARS, the second TARS, and one of the first TERSs and the second TERSs, and remediating a CS corresponding to the MIT.

15 Claims, 7 Drawing Sheets

(56) References Cited

U.S. PATENT DOCUMENTS

| | | | | |
|---|---|---|---|---|
| 2015/0363270 A1* | 12/2015 | Hammer | G06F 16/128 | |
| | | | 711/162 | |
| 2016/0379326 A1* | 12/2016 | Chan-Gove | H04L 63/107 | |
| | | | 705/325 | |
| 2017/0048266 A1* | 2/2017 | Hovor | H04L 63/1433 | |
| 2017/0063894 A1* | 3/2017 | Muddu | G06F 3/0484 | |
| 2017/0295181 A1* | 10/2017 | Parimi | H04L 63/1433 | |
| 2017/0295197 A1* | 10/2017 | Parimi | H04L 63/10 | |
| 2018/0183827 A1* | 6/2018 | Zorlular | H04L 41/06 | |
| 2019/0020666 A1* | 1/2019 | Leung | H04L 63/0227 | |
| 2019/0379678 A1* | 12/2019 | McLean | G06F 16/285 | |
| 2020/0274902 A1* | 8/2020 | Gopal | H04L 63/1425 | |
| 2020/0314141 A1* | 10/2020 | Vajipayajula | H04L 63/145 | |
| 2020/0329071 A1* | 10/2020 | Dani | H04L 63/1433 | |
| 2020/0344256 A1* | 10/2020 | Alabdulhadi | H04L 63/1416 | |
| 2020/0412747 A1* | 12/2020 | Paine | H04L 63/1416 | |
| 2021/0126938 A1* | 4/2021 | Trost | H04L 63/1408 | |
| 2021/0218765 A1* | 7/2021 | Rodriguez Bravo | | |
| | | | H04L 63/1433 | |
| 2021/0248240 A1* | 8/2021 | Comish | G06F 21/577 | |
| 2021/0273978 A1* | 9/2021 | Hadar | G06F 21/577 | |
| 2021/0334748 A1* | 10/2021 | Horesh | G06N 20/00 | |
| 2021/0367961 A1* | 11/2021 | Kuppa | G06N 5/022 | |

* cited by examiner

SYSTEMS, METHODS, AND MEDIA FOR MONITORING CLOUD CONFIGURATION SETTINGS

CROSS-REFERENCE TO RELATED APPLICATION

This application claims priority to Indian Patent Application No. 202011031723, filed Jul. 24, 2020, which is hereby incorporated by reference herein in its entirety.

BACKGROUND

Security of cloud-based services is important to organizations. Hackers employ various attack techniques to infiltrate the cloud-base services, often due to lack of secure configurations and monitoring, leaving the organizations' confidential data vulnerable.

Accordingly, new mechanisms for monitoring and remediating cloud configuration settings are desirable.

SUMMARY

In accordance with some embodiments, systems, methods, and media for monitoring cloud configuration settings are provided.

In some embodiments, methods are provided, the methods comprising: receiving configuration settings from a cloud service resource using an application programming interface; determining a resource risk score, a first tactic risk score, a first plurality of technique risk scores, a second tactic risk score, and a second plurality of technique risk scores, wherein the resource risk score is based on the first tactic risk score and the second tactic risk score, wherein the first tactic risk score is based on the first plurality of technique risk scores, wherein the second tactic risk score is based on the second plurality of technique risk scores, wherein each of the first plurality of technique risk scores is based on a corresponding subset of a set of policy scores, wherein each of the second plurality of technique risk scores is based on a corresponding subset of the set of policy scores, and wherein each of the set of policy scores is based on compliance of the configuration settings with a corresponding setting; and selecting a most-important technique based on the first tactic risk score, the second tactic risk score, and one of the first plurality of technique risk scores and the second plurality of technique risk scores, and remediating a configuration setting corresponding to the most-important technique.

In some of these methods, the resource is a cloud service of one of a Software as a Service (SaaS) vendor, a Platform as a Service (PaaS) vendor, an Infrastructure as a Service (IaaS) vendor.

In some of these methods, each of the first plurality of technique risk scores is based on a weighted sum including the corresponding subset of a set of policy scores, and each of the second plurality of technique risk scores is based on a weighted sum including the corresponding subset of the set of policy scores.

In some of these methods, the first tactic risk score is based on a weighted sum of the first plurality of technique risk scores, and the second tactic risk score is based on a weighted sum of the second plurality of technique risk scores. Further, in some of these methods, the resource risk score is based on a weighted sum including the first tactic risk score and the second tactic risk score.

In some of these methods, the most important technique is based on which of the first tactic risk score and the second tactic risk score is worse.

In some embodiments, systems are provided, the systems comprising: a memory; and a hardware processor coupled to the memory and configured to: receive configuration settings from a cloud service resource using an application programming interface; determine a resource risk score, a first tactic risk score, a first plurality of technique risk scores, a second tactic risk score, and a second plurality of technique risk scores, wherein the resource risk score is based on the first tactic risk score and the second tactic risk score, wherein the first tactic risk score is based on the first plurality of technique risk scores, wherein the second tactic risk score is based on the second plurality of technique risk scores, wherein each of the first plurality of technique risk scores is based on a corresponding subset of a set of policy scores, wherein each of the second plurality of technique risk scores is based on a corresponding subset of the set of policy scores, and wherein each of the set of policy scores is based on compliance of the configuration settings with a corresponding setting; and select a most-important technique based on the first tactic risk score, the second tactic risk score, and one of the first plurality of technique risk scores and the second plurality of technique risk scores, and remediate a configuration setting corresponding to the most-important technique.

In some of these systems, the resource is a cloud service of one of a Software as a Service (SaaS) vendor, a Platform as a Service (PaaS) vendor, an Infrastructure as a Service (IaaS) vendor.

In some of these systems, each of the first plurality of technique risk scores is based on a weighted sum including the corresponding subset of a set of policy scores, and each of the second plurality of technique risk scores is based on a weighted sum including the corresponding subset of the set of policy scores.

In some of these systems, the first tactic risk score is based on a weighted sum of the first plurality of technique risk scores, and the second tactic risk score is based on a weighted sum of the second plurality of technique risk scores. Further, in some of these systems, the resource risk score is based on a weighted sum including the first tactic risk score and the second tactic risk score.

In some of these systems, the most important technique is based on which of the first tactic risk score and the second tactic risk score is worse.

In some embodiments, non-transitory computer-readable media containing computer-executable instructions that, when executed by a processor, cause the processor to perform a method are provided, the method comprising: receiving configuration settings from a cloud service resource using an application programming interface; determining a resource risk score, a first tactic risk score, a first plurality of technique risk scores, a second tactic risk score, and a second plurality of technique risk scores, wherein the resource risk score is based on the first tactic risk score and the second tactic risk score, wherein the first tactic risk score is based on the first plurality of technique risk scores, wherein the second tactic risk score is based on the second plurality of technique risk scores, wherein each of the first plurality of technique risk scores is based on a corresponding subset of a set of policy scores, wherein each of the second plurality of technique risk scores is based on a corresponding subset of the set of policy scores, and wherein each of the set of policy scores is based on compliance of the configuration settings with a corresponding setting; and selecting a most-important technique based on the first tactic risk score, the second tactic risk score, and one of the first plurality of technique risk scores and the second plurality of technique risk scores, and remediating a configuration setting corresponding to the most-important technique.

In some of these non-transitory computer-readable media, the resource is a cloud service of one of a Software as a Service (SaaS) vendor, a Platform as a Service (PaaS) vendor, an Infrastructure as a Service (IaaS) vendor.

In some of these non-transitory computer-readable media, each of the first plurality of technique risk scores is based on a weighted sum including the corresponding subset of a set of policy scores, and each of the second plurality of technique risk scores is based on a weighted sum including the corresponding subset of the set of policy scores.

In some of these non-transitory computer-readable media, the first tactic risk score is based on a weighted sum of the first plurality of technique risk scores, and the second tactic risk score is based on a weighted sum of the second plurality of technique risk scores. Further, in some of these non-transitory computer-readable media, the resource risk score is based on a weighted sum including the first tactic risk score and the second tactic risk score.

In some of these non-transitory computer-readable media, the most important technique is based on which of the first tactic risk score and the second tactic risk score is worse.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with some embodiment, mechanisms, which can include systems, methods, and media for providing risks scores and remediating configuration settings of cloud service resources are provided.

In some embodiments, a resource can be a Software as a Service (SaaS) vendor, a Platform as a Service (PaaS) vendor, an Infrastructure as a Service (IaaS) vendor, and/or any other suitable vendor or entity.

As described further below: the risk scores for a resource can be based on risk scores of tactics used to attack that resource; the risk scores for tactics can be based on risk scores of techniques used to perform those tactics; and the risk scores of techniques can be based on the compliance or non-compliance of configuration settings of the resource with respect to policies associated with the techniques.

The risk scores and compliance with policies can be presented in user interfaces in some embodiments.

In some embodiments, configuration settings can be automatically remediated based on the risk scores so that the worst or most important tactics and techniques are addressed first. This can be critical to mitigating damage resulting from attacks in some embodiments.

Figure 1:
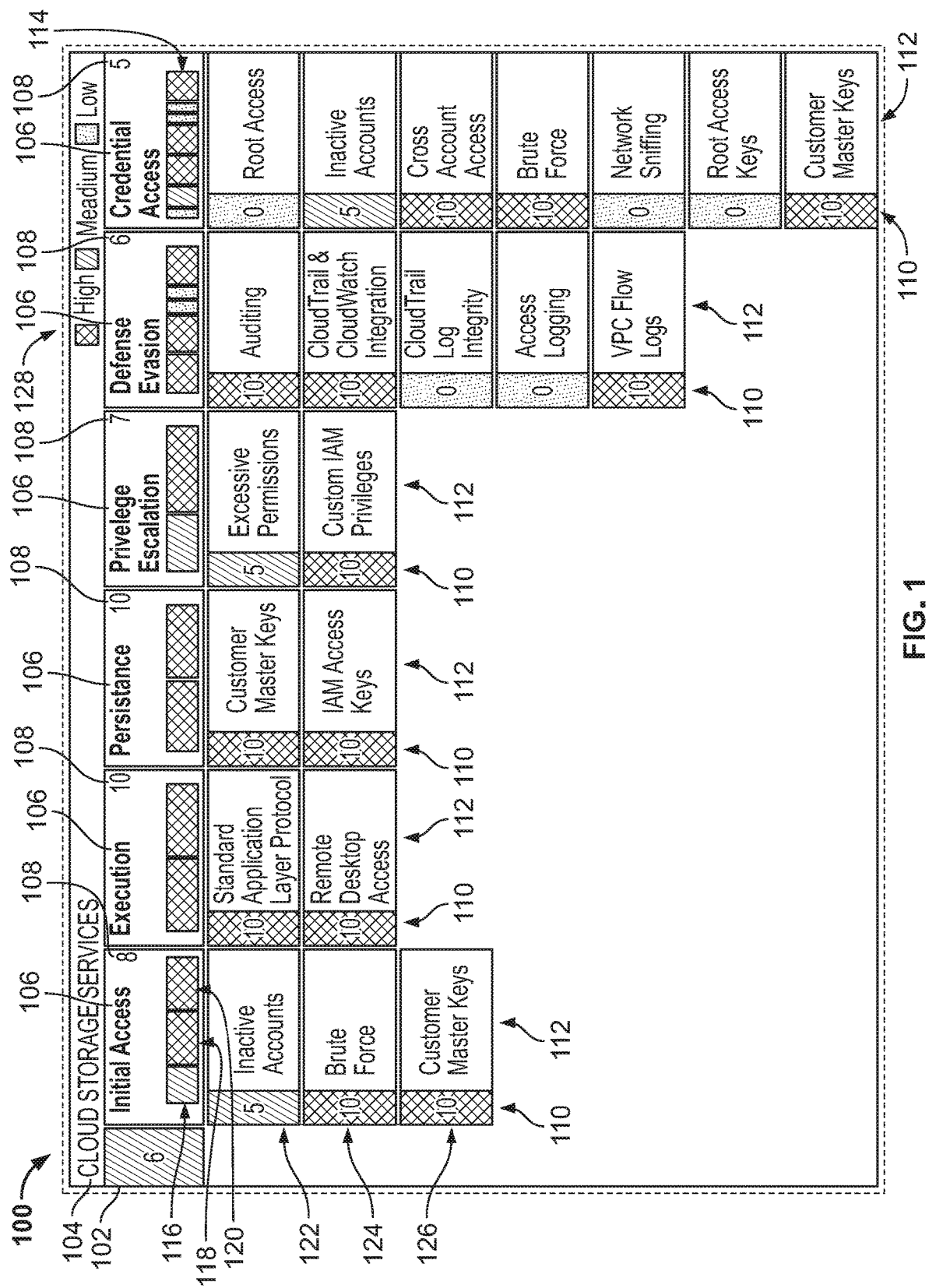
FIG. 1 shows an example of a user interface in accordance with some embodiments of the disclosed subject matter.

Turning to FIG. 1, an example 100 of a user interface for presenting a risk score for a resource, risk scores for different tactics that can be used to attack the resource, and risk scores for different techniques for each tactic is illustrated in accordance with some embodiments. As shown, interface 100 can present a risk score 102 for a particular resource 102 in some embodiments. In the illustrated example, the resource is identified as "Cloud Storage Services" as an example, though this interface or a similar interface can be provided for any suitable cloud service in some embodiments. For example, in some embodiments, interfaces can be provided for cloud service resources such as OFFICE 365 from MICROSOFT CORPORATION, AMAZON WEB SERVICES (AWS) from AMAZON WEB SERVICES, INC., GOOGLE CLOUD PLATFORM from GOOGLE INC., AZURE from MICROSOFT CORPORATION, etc. Risk score 102 can have any suitable value and can be displayed in any suitable manner in some embodiments.

As described further below, risk score 102 can be a combination of risk scores 108 associated with tactics 106 associated with resource 104 in some embodiments. Any suitable tactics can be associated with a resource in some embodiments. In some embodiments, risk score 102 can be a weighted sum of risk scores 108 of tactics 106 associated with resource 104. For example, in some embodiments, the risk score of a resource can be calculated as:

$$\text{risk\_score}_{resource} = w_{tactic\_1} * \text{risk\_score}_{tactic\_1} + w_{tactic\_2} * \text{risk\_score}_{tactic\_2} + \ldots + w_{tactic\_N} * \text{risk\_score}_{tactic\_N},$$

wherein:
- $\text{risk\_score}_{resource}$ is the risk score of the resource, which risk score can have a value from 0 to M (e.g., 10 or any other suitable value), and which may be rounded to the nearest integer;
- $w_{tactic\_i}$ is the weight associated with a tactic i, which weight can have any value from 0 to 1, wherein i is a value from 1 to N (wherein N is the total number of tactics associated with the resource)), and wherein $\sum_{i=1}^{N} w_{tactic\_i} = 1$; and
- $\text{risk\_score}_{tactic\_i}$ is the risk score associated with tactic i, which risk score can have a value from 0 to M, which may be rounded to the nearest integer, and wherein i and M are defined as described above.

In some embodiments, any two or more of the weights associated with tactics 106 can have the same value. In some embodiments, all of the weights associated with tactics 106 can have the same value.

Tactis 106 can be any suitable tactics for attacking resource 104 in some embodiments. For example, in some embodiments, the tactics can include those defined in the MITRE ATT&CK FRAMEWORK, available at www.attack.mitre.org.

As described further below, each risk score 108 for a tactic 106 can be a combination of risk scores 110 associated with techniques 112 associated with tactic 106 in some embodiments. Any suitable techniques can be associated with each tactic in some embodiments. In some embodiments, risk score 108 for a tactic 106 can be a weighted sum of risk scores 110 of techniques 112 associated with each tactic source 104. For example, in some embodiments, the risk score of a tactic can be calculated as:

$$\text{risk\_score}_{tactic} = w_{technique\_1} * \text{risk\_score}_{technique\_1} + w_{technique\_2} * \text{risk\_score}_{technique\_2} + \ldots + w_{technique\_N} * \text{risk\_score}_{technique\_N},$$

wherein:
$\text{risk\_score}_{tactic}$ is the risk score of the tactic, which risk score can have a value from 0 to M (e.g., 10 or any other suitable value), and which may be rounded to the nearest integer;
$w_{technique\_i}$ is the weight associated with a technique i, which weight can have any value from 0 to 1, wherein i is a value from 1 to N (wherein N is the total number of techniques associated with the tactic)), and wherein $w_{technique\_i} = 1$; and $\text{risk\_score}_{technique\_i}$ is the risk score associated with technique i, which risk score can have a value from 0 to M, which may be rounded to the nearest integer, and wherein i and M are defined as described above.

In some embodiments, the relative weighting of the techniques in calculating the risk score for an associated tactic can be shown by the lengths of bars in regions 114. For example, as shown by the lengths of bars 116, 118, and 120, techniques 122, 124, and 126, respectively, can have corresponding relative weights. More particularly, for example, technique 122 can have a weight that is smaller than the weights of techniques 124 and 126 as reflected by bar 116 being shorter than bars 118 and 120.

In some embodiments, any two or more of the weights associated with techniques 112 can have the same value. In some embodiments, all of the weights associated with techniques 112 can have the same value.

Techniques 112 can be any suitable techniques for a tactic in some embodiments. For example, in some embodiments, the techniques for a tactic can include those defined in the MITRE ATT&CK FRAMEWORK, available at www.attack.mitre.org and/or any other suitable techniques.

As described further below, each risk score 110 for a technique 112 can be based on one or more policies associated with each technique, in some embodiments. Any suitable one or more policies can be associated with each technique in some embodiments. In some embodiments, risk score 110 for a technique 112 can be a weighted sum of policy scores of policies associated with each technique 112. For example, in some embodiments, the risk score of a technique can be calculated as:

$$\text{risk\_score}_{technique} = w_{policy\_1} * \text{policy\_score}_{policy\_1} + w_{policy\_2} * \text{policy\_score}_{policy\_2} + \ldots + w_{policy\_N} * \text{policy\_score}_{policy\_N},$$

wherein:
$\text{risk\_score}_{technique}$ is the risk score of the technique, which risk score can have a value from 0 to M (e.g., 10 or any other suitable value), and which may be rounded to the nearest integer;
$w_{policy\_i}$ is the weight associated with a policy i, which weight can have any value from 0 to (e.g., 10 or any other suitable value), wherein i is a value from 1 to N (wherein N is the total number of policies associated with the technique)), and wherein $\Sigma_{i=1}^{N} w_{policy\_i} = M$ (wherein M is described as above); and
$\text{policy\_score}_{policy\_i}$ is the policy score associated with policy i, which policy score can have a value of 1 or 0 depending on whether the policy is met or not, respectively, and wherein i are defined as described above.

Policies can be any suitable policies for a technique 112 in some embodiments. For example, in some embodiments, the policies can include the "mitigations" defined in the MITRE ATT&CK FRAMEWORK, available at www.attack.mitre.org and/or any other suitable policies and/or mitigation steps.

In accordance with some embodiments, as shown in FIG. 1, any of risk scores 102, 108, and 110 can be shown in association with any suitable colors. For example, in some embodiments, as shown by key 128, risk scores can be shown in association with red, orange, and green to reflect that the scores have high, medium, and low risk, respectively. As a more particular example, in some embodiments, risk scores of 0-3 can be classified as low and be associated with the color green, risk scores of 4-6 can be classified as medium and be associated with the color orange, and risk scores of 7-10 can be classified as high and be associated with the color red. The association of a risk score with a color can be presented in any suitable manner in some embodiments. For example, in some embodiments, the color can be presented as a foreground color (e.g., as shown by risk scores 108) or a background color (e.g., as shown by risk scores 110) of a risk score in some embodiments. Although red, orange, and green are described herein, any suitable colors can be used in some embodiments.

Figure 2:
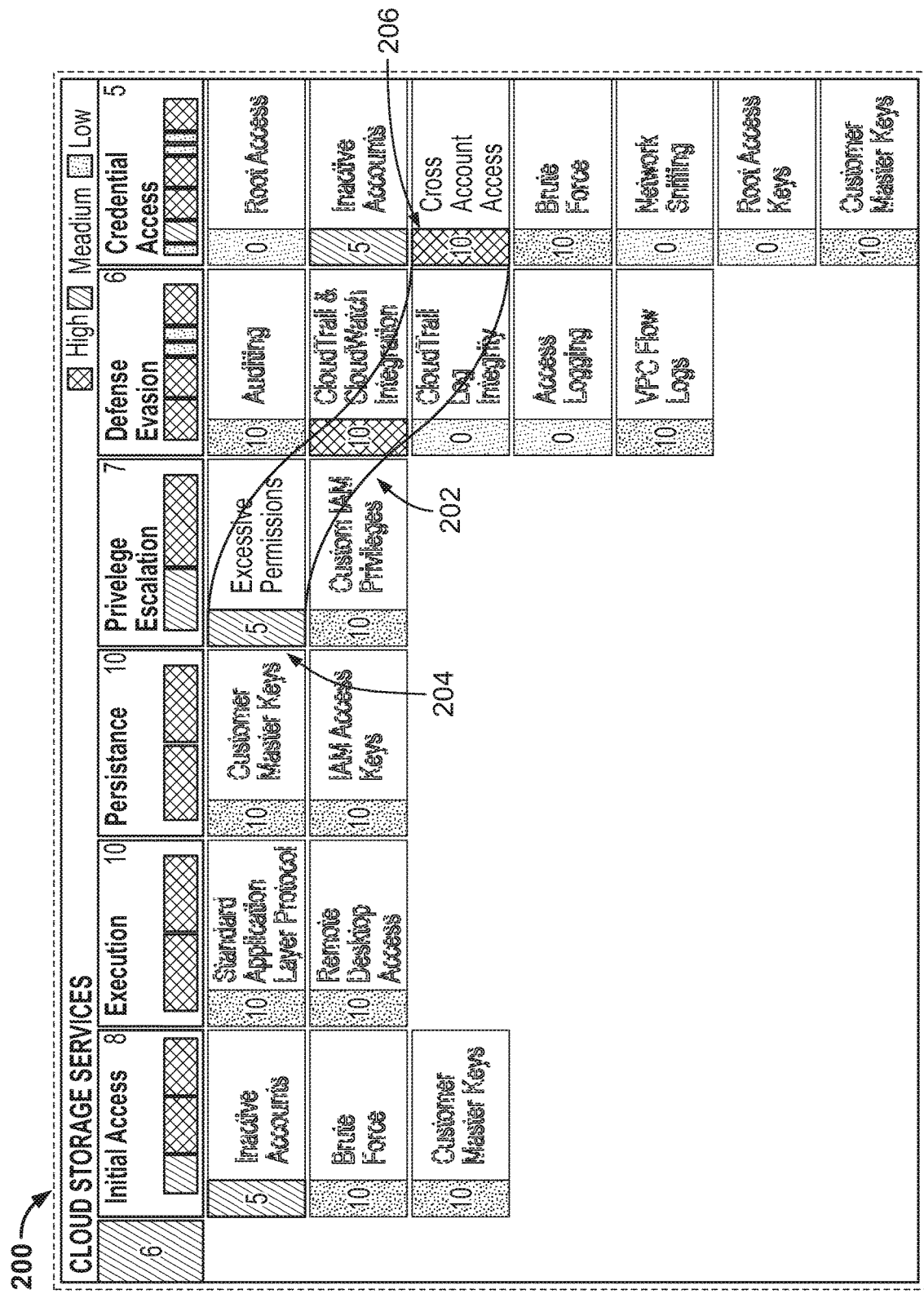
FIG. 2 shows an example of another user interface in accordance with some embodiments of the disclosed subject matter.

In accordance with some embodiments, as shown in FIG. 2, two or more techniques from two or more different tactics can be associated and this association can be reflected in a user interface. For example, as shown in FIG. 2, techniques 204 and 206 can be associated as reflected by indicator 202. Indicators, such as indicator 202, showing associations between techniques can have any suitable shape, size, and color in some embodiments. In some embodiments, indicator 202 can describe the path that an attacker can employ or has employed in order to exploit the resource. For example, as shown by FIG. 2, an attacker acquired excessive permissions due to which it was able to access other accounts which the current account has access to.

Figure 3:
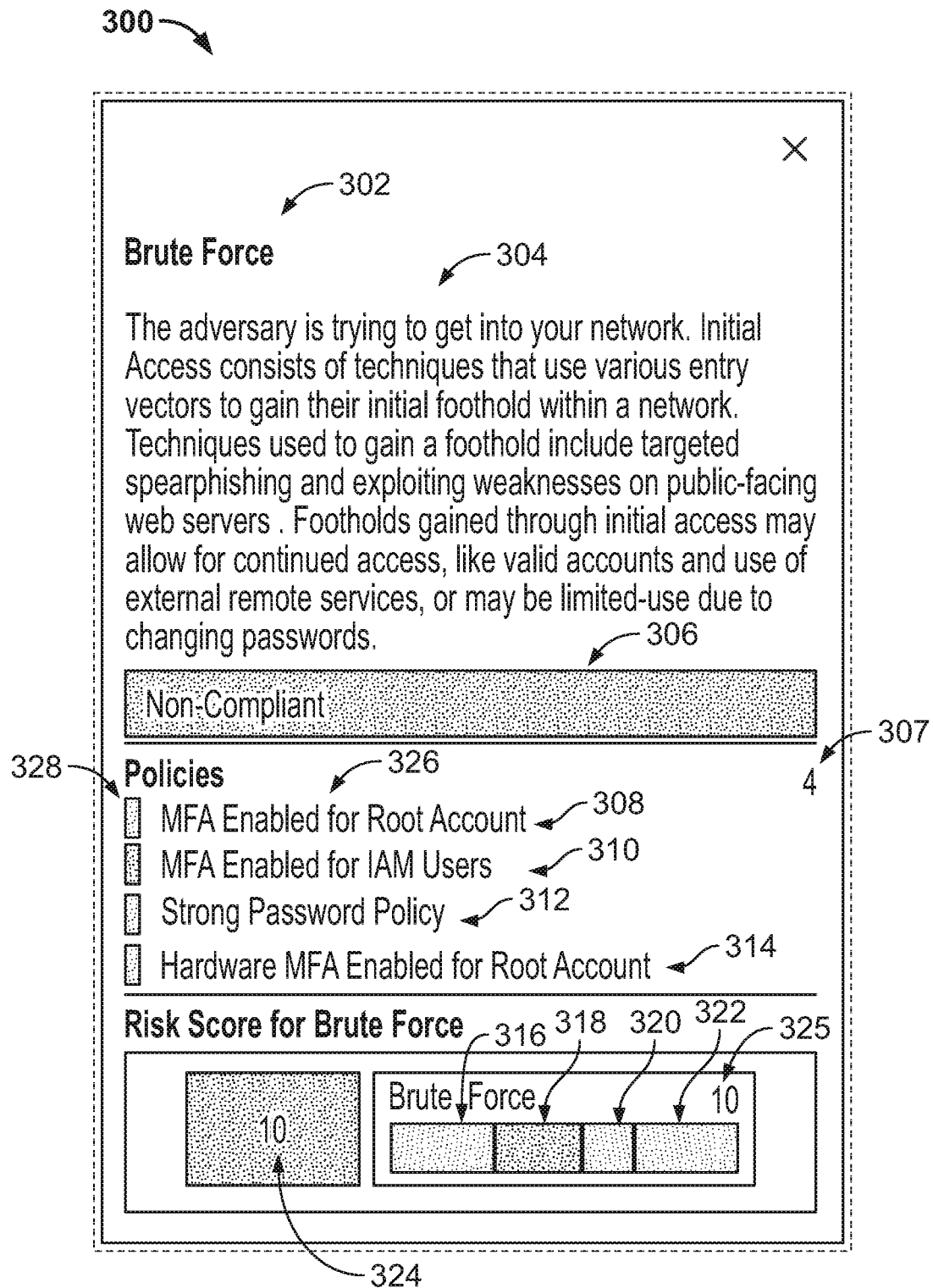
FIG. 3 shows an example of yet another user interface in accordance with some embodiments of the disclosed subject matter.

In accordance with some embodiments, an information window can be presented to a user when clicking on a technique 112 in interface 100 or 200. Turning to FIG. 3, an example 300 of an information window in accordance with some embodiments is shown. As illustrated, window 300 shows a name 302 and a description 304 of the selected technique. Any suitable name and/or description for name 302 and description 304 can be used in some embodiments. For example, in some embodiments, the name and the description can match those of techniques provided in the MITRE ATT&CK FRAMEWORK, available at www.attack.mitre.org.

Information window 300 can also provide an indicator 306 of whether the technique is compliant with all policies associated with the technique in some embodiments. For example, as shown in FIG. 3, the technique is non-compliant because one policy (policy 310) has not been met.

In some embodiments, one or more policies can be presented in an information window. For example, as shown in FIG. 3, policies 308, 310, 312, and 314 can be presented in in some embodiments. Each policy can be presented with a name 326 of the policy and a color indicator 328 indicating whether the policy is met, in some embodiments. For example, as shown for policy 308, the name "MFA Enabled for Root Account" is shown and a green indicator is shown to reflect that the policy is met. As another example, as shown for policy 310, the name "MFA Enabled for IAM User" is shown and a red indicator is shown to reflect that the policy is not met. Any suitable names can be used in some embodiments. For example, in some embodiments, the policy names can include the names of "mitigations" defined in the MITRE ATT&CK FRAMEWORK, available at www.attack.mitre.org and/or any other suitable policies and/or mitigation steps. Although red and green are described herein, any suitable colors can be used in some embodiments.

In some embodiments, a count 307 of the number of policies associated with a technique can be shown in information window 300. This count can be shown in any suitable manner in some embodiments.

As also shown in FIG. 3, information window 300 can also show risk score 324 and/or risk score 325 associated with the selected technique in some embodiments. As shown by bars 316, 318, 320, and 322, the relative weighting of each of policies 308, 310, 312, and 314, respectively, can be indicated similarly to what is shown by bars 114 of FIG. 1 as described above.

Figure 4:
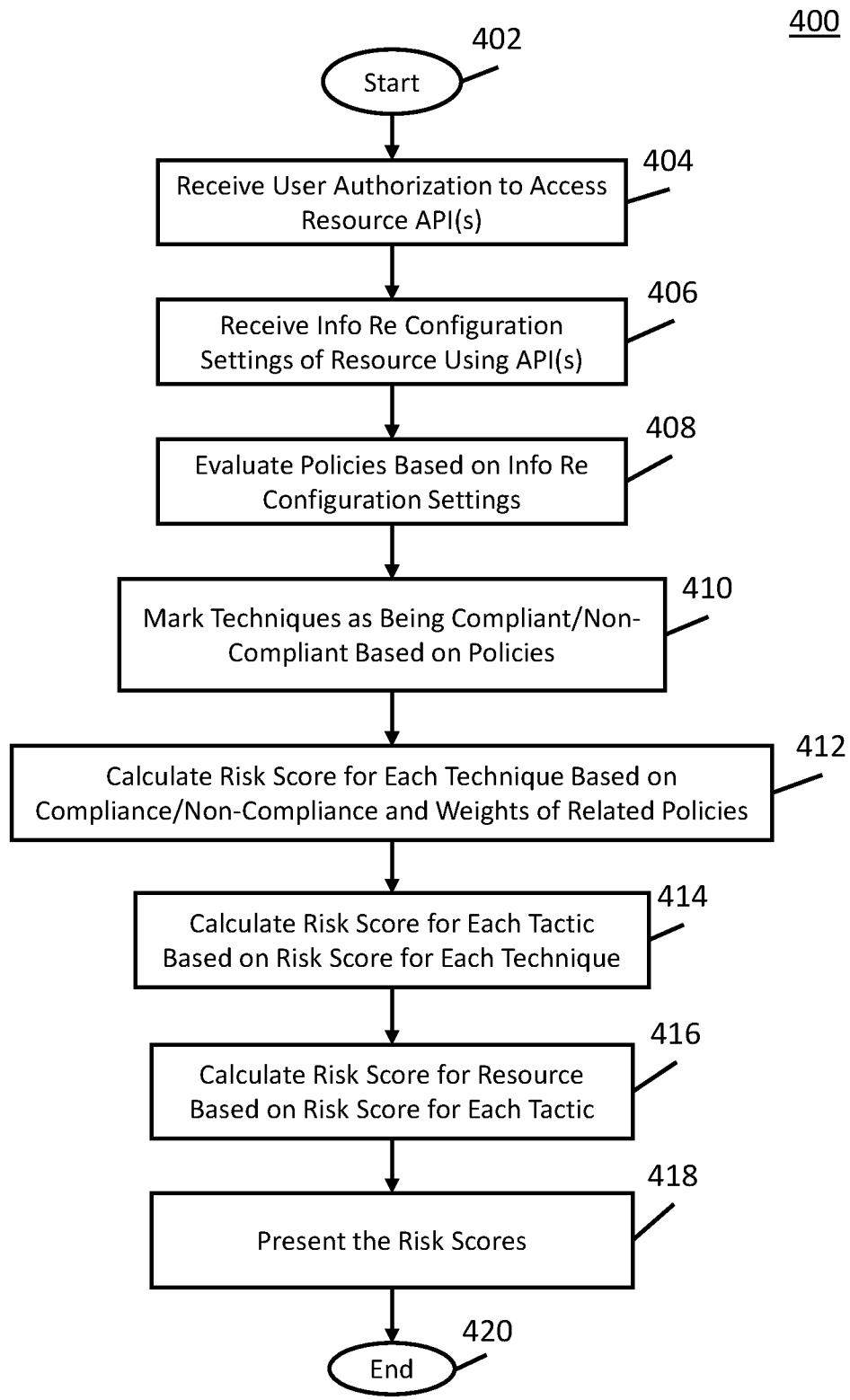
FIG. 4 shows an example of a process for calculating and presenting risk scores in accordance with some embodiments of the disclosed subject matter.

Turning to FIG. 4, an example 400 of a process for determining and presenting risk scores for a resource in accordance with some embodiments is illustrated. An identical or similar process can be provided for each resource in some embodiments, or this process can be modified to generate and present risk scores for all resources in some embodiments.

As shown, after process 400 begins at 402, the process receives user authorization for the process to access a resource using the resource's application programming interface(s) (API(s)) at 404. The resource can be any suitable resource, such as a cloud service provider. For example, in some embodiments, the resources can be OFFICE 365 from MICROSOFT CORPORATION, AMAZON WEB SERVICES (AWS) from AMAZON WEB SERVICES, INC, GOOGLE CLOUD PLATFORM from GOOGLE INC., AZURE from MICROSOFT CORPORATION, etc. The API(s) can be any suitable API(s), such as API(s) for accessing configuration settings of the resource. User authorization can be granted in any suitable manner, such as by the user accessing an interface of the resource (e.g., using a web page) and granting permission to the process to access the API(s).

Next, at 406, process 400 can receive information regarding configuration settings of the resource using the API(s). The process can access the API(s) in any suitable manner, such as by sending messages to the API(s), in some embodiments. Any suitable information on any suitable configuration settings can be received in some embodiments. For example, information regarding configuration settings associated with policies as described above can be received in some embodiments.

Next, at 408, process 400 can evaluate whether the policies are being met based on the information regarding the configuration settings in some embodiments. These evaluations can be performed in any suitable manner in some embodiments. These evaluations can result in the policies being marked as being met or not met as shown in and described in above in some embodiments.

Then, at 410, the techniques can be marked as compliant or non-compliant in some embodiments. For example, in some embodiments, a technique can be marked as being compliant when all of the policies associated with the technique have been met. As another example, in some embodiments, when a threshold number of the policies associated with a technique have been met, the technique can be marked as being compliant. If a technique is not marked as being compliant, the technique can be marked as being non-compliant in some embodiments. The marking of a technique as being compliant or non-compliant can result in indicator 306 of FIG. 3 being presented.

Next, at 412, process 400 can calculate the risk score for each technique based on the compliance/non-compliance and the weights of the polices associated with the technique as described above in connection with FIG. 1 in some embodiments.

Then, at 414, process 400 can calculate the risk score for each tactic based on the risk score for each technique associated with the tactic as described above in connection with FIG. 1 in some embodiments.

Next, at 416, process 400 can calculate the risk score for the resource based on the risk score for each tactic associated with the resource as described above in connection with FIG. 1 in some embodiments.

The risk scores can then be presented at 418 in any suitable manner, such as using the interfaces described in connection with FIGS. 1-3, in some embodiments.

Process 400 can then end at 420 in some embodiments.

In some embodiments, automatic remediation of configuration settings can be performed to minimize risk associated with those configurations in some embodiments. For example, such automatic remediation can be provided as shown by example process 500 of FIG. 5 in some embodiments.

Figure 5:
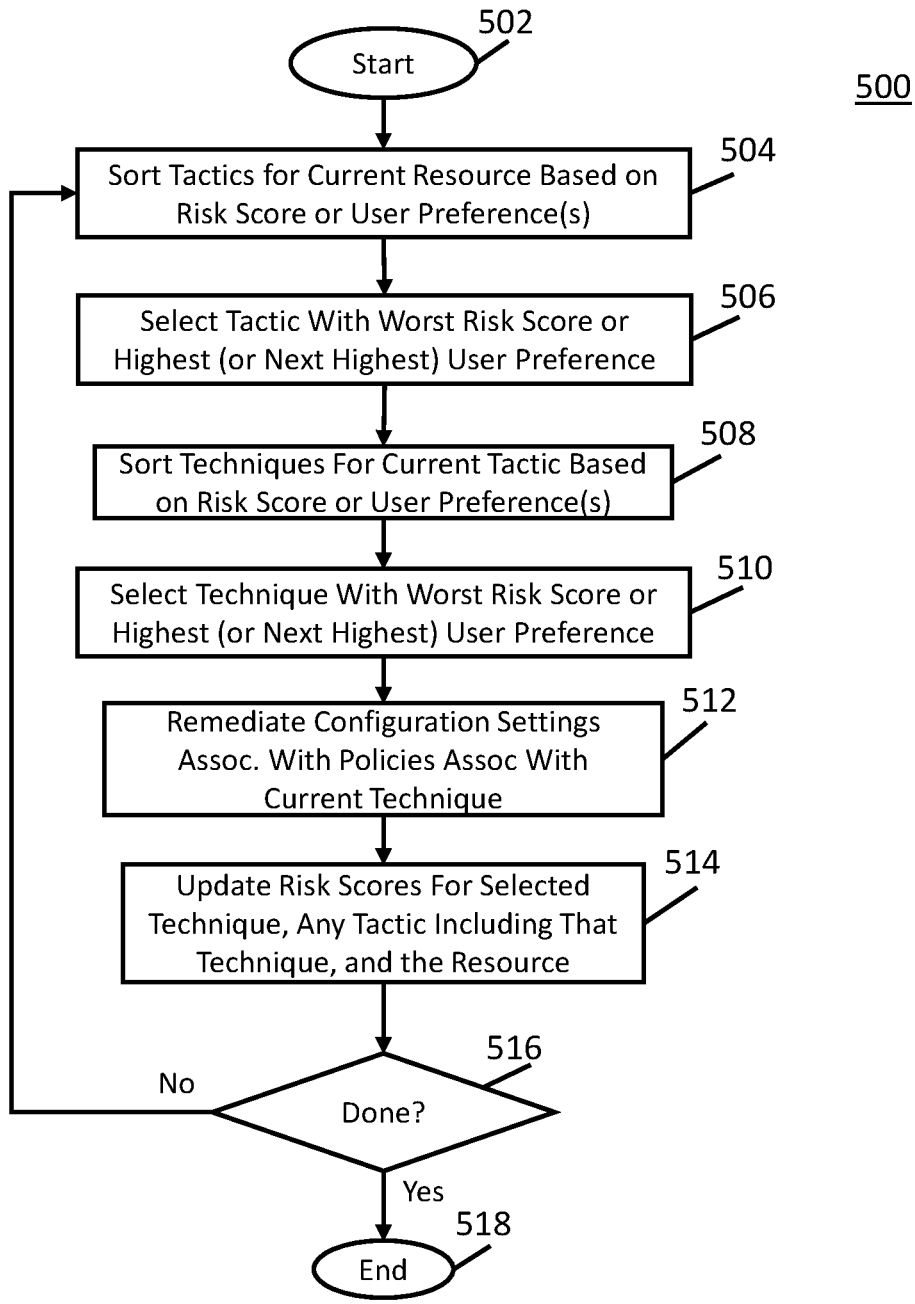
FIG. 5 shows an example of a process for remediating configuration settings in accordance with some embodiments of the disclosed subject matter.

As illustrated in FIG. 5, after process 500 has begun at 502, the process can sort tactics for a current resource based on their risk scores or user preference(s) in some embodiments. For example, in some embodiments, tactics for the current resource can be sorted by their risk scores so that the tactic with the worst (e.g., highest) risk score appears first in a list of the tactics. As another example, in some embodiments, tactics for the current resource can be sorted by a ranking of importance of the tactics provided in user preferences so that the tactic with the most important tactic appears first in a list of the tactics.

Next, at 506, process 500 can select the tactic with the worst score or highest (or next highest in the case of loops of process 500 after the first) user preference in some embodiments.

Then, at 508, process 500 can sort techniques for the current tactic based on their risk scores or user preference(s) in some embodiments. For example, in some embodiments, techniques for the current tactic can be sorted by their risk scores so that the technique with the worst (e.g., highest) risk score appears first in a list of the techniques. As another example, in some embodiments, techniques for the current tactic can be sorted by a ranking of importance of the techniques provided in user preferences so that the technique with the most important tactic appears first in a list of the techniques.

Next, at 510, process 500 can select the techniques with the worst score or highest (or next highest in the case of loops of process 500 after the first) user preference in some embodiments.

At 512, process 500 can then remediate configurations settings associated with policies associated with the current technique in some embodiments. This remediation can be performed in any suitable manner in some embodiments. For example, in some embodiments, this remediation can be performed by modifying the configuration settings to match requirements of one or more policies. In some embodiments, the configuration settings can be modified by sending a message to the API(s) of the resource.

Then, at 514, process 500 can update the risk scores for the current technique, any tactic including that technique, and the resource in some embodiments. This update can be performed by performing appropriate portions of process 400 of FIG. 4 in some embodiments.

Next, at 516, process 500 can determine if it is done in some embodiments. This determination can be made in any suitable manner in some embodiments. For example, in some embodiments, process 500 can be determined as being done when the risk score for the resource has met or exceeded a certain threshold, the risk scores for all tactics have met or exceeded one or more thresholds, the risk scores for all techniques have met or exceeded one or more thresholds, all techniques have been determined as being compliant, and/or based on any other suitable criteria or criterion.

If process 500 is determined as not being done at 516, process 500 can loop back to 504. Otherwise, process 500 can end at 518.

The table below shows example of resources, tactics, techniques, policies (for some techniques only), and policy descriptions (for some policies only) that can be used in some embodiments. Any suitable resources, tactics, techniques, policies, and policy descriptions can be used in some embodiments.

| Resource | Tactic | Technique | Policy | Policy Description |
|---|---|---|---|---|
| Amazon Web Services | | | | |
| | Initial Access | | | |
| | | Inactive Accounts | | |
| | | Brute Force | | |
| | | | MFA Enabled for Root Account | |
| | | | MFA Enabled for IAM Users | |
| | | | Strong Password Policy | |
| | | | Hardware MFA Enabled for Root Account | |
| | | Customer Master Keys | | |
| | | Idle session | | |
| | | | Enable activity based authentication timeout for Single Sign On | The ActivityBasedAuthenticationTimeoutWith-SingleSignOnEnabled parameter specifies whether to keep single sign-on enabled. |
| | | | Enable activity based authentication timeout | The ActivityBasedAuthenticationTimeoutEnabled parameter specifies whether the timed logoff feature is enabled. |
| | | | Sign out inactive users | Idle session sign-out is one of a number of policies you can use with certain cloud storage to balance security and user productivity and help keep your data safe regardless where users access the data, what device they're working on, and how secure their network connection is. Idle session sign-out lets you specify a time at which users are warned and subsequently signed out after a period of browser inactivity. |
| | Execution | | | |
| | | Standard Application Layer Protocol | | |
| | | Remote Desktop Access | | |
| | | | Unrestricted Remote Desktop Access | |
| | Persistence | | | |
| | | Customer Master Keys | | |
| | | IAM Access Keys | | |

-continued

| Resource | Tactic | Technique | Policy | Policy Description |
|---|---|---|---|---|
| | Privelege Escalation | | | |
| | | Excessive Permissions | | |
| | | Custom IAM Privileges | | |
| | Defense Evasion | | | |
| | | Auditing CloudTrail & Cloud Watch Integration | | |
| | | CloudTrail Log Integrity | | |
| | | Access Logging | | |
| | | VPC Flow Logs | | |
| | Credential Access | | | |
| | | Root Access | | |
| | | Inactive Accounts | | |
| | | Cross Account Access | | |
| | | Brute Force | | |
| | | Network Sniffing | | |
| | | Root Access Keys | | |
| | | Customer Master Keys | | |
| | Discovery | | | |
| | | Network Sniffing | | |
| | Lateral Movement | | | |
| | | Standard Application Layer Protocol | | |
| | | RPC | | |
| | Collection | | | |
| | | Public Access | | |
| | | Unencrypted Storage | | |
| | | Unencrypted AMI | | |
| | | Unrestricted Database Access | | |
| | | Unrestricted FTP Access | | |
| | Command and Control | | | |
| | | Standard Application Layer Protocol | | |
| | | Uncommonly Used Port | | |
| | | Exfiltration | | |
| | Exfiltration | | | |
| | | Unrestricted Database Access | | |
| | | Public Access | | |
| | | Unencrypted Storage | | |
| | | Unencrypted AMI | | |
| | | Unencrypted Communication at Rest | | |
| | | Unrestricted FTP Access | | |

-continued

| Resource | Tactic | Technique | Policy | Policy Description |
|---|---|---|---|---|
| Office 365 | Impact | Data Destruction | | |
| | | Data Manipulation | | |
| | | Denial of Service (DOS) | | |
| | Initial Access | | | |
| | | Impersonation | | |
| | | Idle Session | | |
| | | Brute Force | Enforce Strong Password Policy for All Users | Enforce strong password policy for all users |
| | | | Require MFA for All Users | Ensure all users authenticate using MFA(Multi-Factor Authentication) |
| | | Spearphishing Link | | |
| | Execution | | | |
| | | Malicious Files | | |
| | | PowerShell | | |
| | Persistence | | | |
| | | Create Account | | |
| | | Modify Group Membership | | |
| | Privilege Escalation | | | |
| | | Create Sites | | |
| | | Admin Access | | |
| | | Group Access | | |
| | | Impersonation | | |
| | Defense Evasion | | | |
| | | Admin Notification | | |
| | | Auditing | | |
| | Credential Access | | | |
| | | Idle Session | | |
| | | Guest Access | | |
| | | Access from Unmanaged Devices | Block or limit access to specific SharePoint site collections | |
| | | | Enable Public Computer Detection for Outlook Web | |
| | | | Limit access to SharePoint and OneDrive Content at Organization | |
| | | Brute Force | | |
| | Discovery | | | |
| | | Group Membership Discovery | | |
| | Lateral Movement | | | |
| | | Connected Apps | | |
| | Collection | | | |
| | | Anonymous Access | | |
| | | Video Capture | | |
| | | Unencrypted Data | | |

-continued

| Resource | Tactic | Technique | Policy | Policy Description |
|---|---|---|---|---|
| | | Non-Owner Sharing Content Exfiltration Via Browser External User Re-Sharing External Domain Sharing | | |
| | Command and Control | | | |
| | | Access from Untrusted Network Remote Control | | |
| | Exfiltration | | | |
| | | Content Exfiltration Via Browser External User Re-Sharing External Domain Sharing Access from Unmanaged Devices Non-Owner Sharing Guest Access Anonymous Access | | |
| | | | Set default age limit for the contents of public folders across the entire organization | Set default age limit for the contents of public folders across the entire organization. Content in a public folder is automatically deleted when this age limit is exceeded. This attribute applies to all public folders in the organization that don't have their own AgeLimit setting. |
| | | | Do not allow public folders to be deployed in your organization | Do not allow public folders to be deployed in your organization. |
| | | | Require anonymous links to expire | Require anonymous links to expire after some days. |
| | | | Disable anonymous users from joining the meeting | Disable anonymous users from joining the meeting. Only authenticated users that is, users logged on to your Active Directory Domain Services or the Active Directory of a federated partner are allowed to attend the meeting. |
| | | | Disable Dial out for anonymous users | Disable Dial out for anonymous users. With dial-out phoning the conferencing server will telephone the user; when the user answers the phone, he or she will be joined to the conference. |
| | | | Set default link type to Internal when users get links for sharing at Organization level | Set the default type of link to something more restrictive, while still allowing users to select other types of links as needed. This setting can be configured both globally for SharePoint Online and at the site collection level. The global setting acts as a default for the site collections. |

| Resource | Tactic | Technique | Policy | Policy Description |
|---|---|---|---|---|
| | | | Disable creation of Anonymous Links at Tenant level | Do not allow creation of anonymous links in your sharepoint online tenant. |
| | Impact | Unencrypted Data | | |
| | | Data Manipulation | | |

Figure 6:
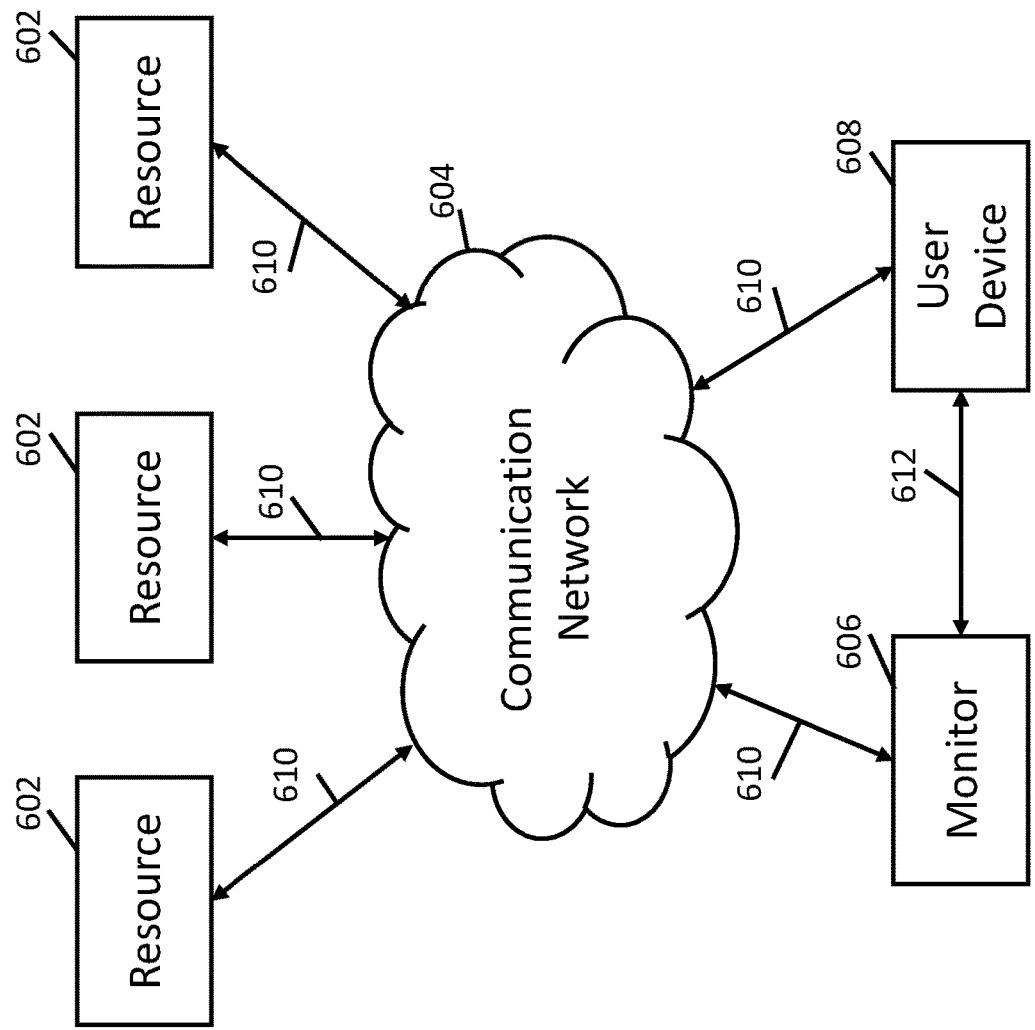
FIG. 6. shows an example of a block diagram of components that can be used in one or more system in accordance with some embodiments of the disclosed subject matter.

Turning to FIG. 6, an example 600 of a block diagram of hardware that can be used in accordance with some embodiments is illustrated. As shown, block diagram 600 includes resources 602, communication network 604, monitor 606, and user device 608.

Resources 602 can be any suitable cloud resources and may be implemented as any suitable one or more general purpose computers or special purposed computers. For example, in some embodiments, resources 602 can be any suitable one or more general purpose computers or special purposed computers of a Software as a Service (SaaS) vendor, a Platform as a Service (PaaS) vendor, an Infrastructure as a Service (IaaS) vendor, and/or any other suitable vendor or entity.

Communication network 604 can be any suitable combination of one or more wired and/or wireless networks in some embodiments. For example, communication network 604 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network.

Resources 602, monitor 606 and user devices 608 can be connected by one or more communications links 610 to communication network 604. The communications links can be any communications links suitable for communicating data among resources 602, monitor 606, user devices 608, and communication network 604, such as network links, dial-up links, wireless links, hard-wired links, any other suitable communications links, or any suitable combination of such links, in some embodiments.

Monitor can be any suitable device(s), such as any suitable one or more general purpose computers or special purposed computers, for generating the user interfaces of, or interfaces similar to those of, FIG. 1, FIG. 2, and/or FIG. 3, and/or for performing the processes of, processes similar to those of, FIG. 1 and/or FIG. 2, in some embodiments.

User devices 608 can include any one or more user devices. For example, in some embodiments, user devices 608 can include a mobile phone, a tablet computer, a desktop computer, a laptop computer, and/or any other suitable type of user device.

In some embodiments, monitor 606 and 608 can communicate directly using communication link 612. Communication link 612 can be any suitable link for communicating between monitor 606 and 608, such as a wireless link, a hard-wired link, any other suitable communications link, or any suitable combination of such links, in some embodiments.

Although three resources 602, once monitor 606, and one user device 608 are illustrated, any suitable number of components 602, 606, and 608 can be used in some embodiments, and any of such components can be implement using one or more devices.

Figure 7:
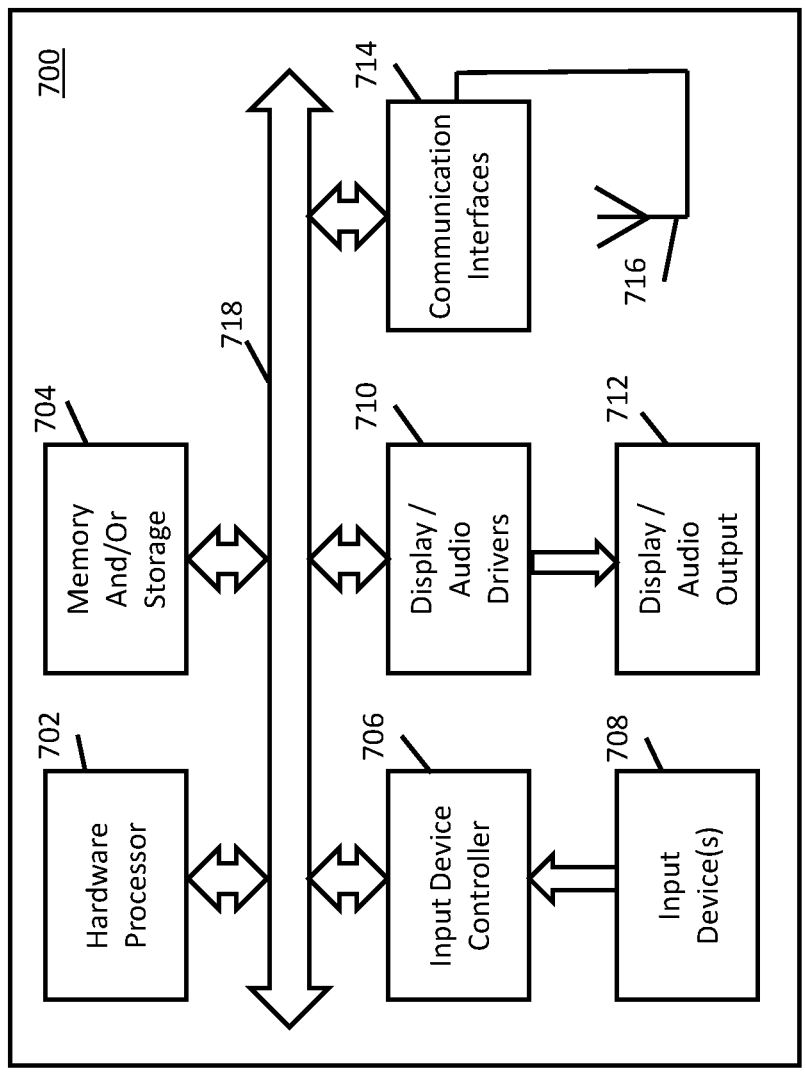
FIG. 7 shows a detailed example of hardware that can be used in components of one or more system (such as the system(s) of FIG. 6) in accordance with some embodiments of the disclosed subject matter.

Resources 602, monitor 606, and user devices 608 can be implemented using any suitable hardware in some embodiments. For example, in some embodiments, components 602, 606, and 608 can be implemented using any suitable general-purpose computer or special purpose computer. Any such general-purpose computer or special purpose computer can include any suitable hardware. For example, as illustrated in example hardware 700 of FIG. 7, such hardware can include hardware processor 702, memory and/or storage 704, an input device controller 706, an input device 708, display/audio drivers 710, display and audio output circuitry 712, communication interface(s) 714, an antenna 716, and a bus 718.

Hardware processor 702 can include any suitable hardware processor, such as a microprocessor, a micro-controller, digital signal processor(s), dedicated logic, and/or any other suitable circuitry for controlling the functioning of a general purpose computer or a special purpose computer in some embodiments.

Memory and/or storage 704 can be any suitable memory and/or storage for storing programs, data, and/or any other suitable information in some embodiments. For example, memory and/or storage 704 can include random access memory, read-only memory, flash memory, hard disk storage, optical media, and/or any other suitable memory.

Input device controller 706 can be any suitable circuitry for controlling and receiving input from one or more input devices 708 in some embodiments. For example, input device controller 706 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 710 can be any suitable circuitry for controlling and driving output to one or more display/audio output devices 712 in some embodiments. For example, display/audio drivers 710 can be circuitry for driving a touchscreen, a flat-panel display, a cathode ray tube display, a projector, a speaker or speakers, and/or any other suitable display and/or presentation devices.

Communication interface(s) 714 can be any suitable circuitry for interfacing with one or more communication networks (e.g., computer network 604 of FIG. 6). For example, interface(s) 714 can include network interface card circuitry, wireless communication circuitry, and/or any other suitable type of communication network circuitry.

Antenna 716 can be any suitable one or more antennas for wirelessly communicating with a communication network (e.g., communication network 604 of FIG. 6) in some embodiments. In some embodiments, antenna 716 can be omitted.

Bus 718 can be any suitable mechanism for communicating between two or more components 702, 704, 706, 710, and 714 in some embodiments.

Any other suitable components can be included in hardware 700 in accordance with some embodiments.

In some embodiments, at least some of the above described blocks of the processes of FIGS. 4 and 5 can be executed or performed in any order or sequence not limited to the order and sequence shown in and described in connection with the figures. Also, some of the above blocks of FIGS. 4 and 5 can be executed or performed substantially simultaneously where appropriate or in parallel to reduce latency and processing times. Additionally or alternatively, some of the above described blocks of the processes of FIGS. 4 and 5 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method comprising:
receiving configuration settings from a cloud service resource using an application programming interface;
determining a resource risk score, a first tactic risk score, a first plurality of technique risk scores, a second tactic risk score, and a second plurality of technique risk scores, wherein the resource risk score is based on the first tactic risk score and the second tactic risk score, wherein the first tactic risk score is based on the first plurality of technique risk scores, wherein the second tactic risk score is based on the second plurality of technique risk scores, wherein each of the first plurality of technique risk scores is based on a corresponding subset of a set of policy scores, wherein each of the second plurality of technique risk scores is based on a corresponding subset of the set of policy scores, and wherein each of the set of policy scores is based on compliance of the configuration settings with a corresponding setting; and
selecting a first tactic based on the first tactic risk score being worse than the second tactic risk score, selecting a technique of the first tactic based on the technique corresponding to a worst of the first plurality of technique risk scores, and remediating a configuration setting corresponding to the technique,
wherein each of the first tactic risk score and the second tactic risk score reflects a risk of a corresponding tactic that can be used to attack a resource, and
wherein each of the first plurality of technique risk scores and the second plurality of technique risk scores reflects a risk of a corresponding technique that can be used to perform a corresponding tactic in attacking a resource.

2. The method of claim 1, wherein the resource is a cloud service of one of a Software as a Service (SaaS) vendor, a Platform as a Service (PaaS) vendor, an Infrastructure as a Service (IaaS) vendor.

3. The method of claim 1, wherein each of the first plurality of technique risk scores is based on a weighted sum including the corresponding subset of a set of policy scores, and wherein each of the second plurality of technique risk scores is based on a weighted sum including the corresponding subset of the set of policy scores.

4. The method of claim 3, wherein the first tactic risk score is based on a weighted sum of the first plurality of technique risk scores, and wherein the second tactic risk score is based on a weighted sum of the second plurality of technique risk scores.

5. The method of claim 4, wherein the resource risk score is based on a weighted sum including the first tactic risk score and the second tactic risk score.

6. A system comprising:
a memory; and
a hardware processor coupled to the memory and configured to:
receive configuration settings from a cloud service resource using an application programming interface;
determine a resource risk score, a first tactic risk score, a first plurality of technique risk scores, a second tactic risk score, and a second plurality of technique risk scores, wherein the resource risk score is based on the first tactic risk score and the second tactic risk score, wherein the first tactic risk score is based on the first plurality of technique risk scores, wherein the second tactic risk score is based on the second plurality of technique risk scores, wherein each of the first plurality of technique risk scores is based on a corresponding subset of a set of policy scores, wherein each of the second plurality of technique risk scores is based on a corresponding subset of the set of policy scores, and wherein each of the set of policy scores is based on compliance of the configuration settings with a corresponding setting; and
select a first tactic based on the first tactic risk score being worse than the second tactic risk score, select a technique of the first tactic based on the technique corresponding to a worst of the first plurality of technique risk scores, and remediate a configuration setting corresponding to the technique,
wherein each of the first tactic risk score and the second tactic risk score reflects a risk of a corresponding tactic that can be used to attack a resource, and wherein each of the first plurality of technique risk scores and the second plurality of technique risk scores reflects a risk of a corresponding technique that can be used to perform a corresponding tactic in attacking a resource.

7. The system of claim 6, wherein the resource is a cloud service of one of a Software as a Service (SaaS) vendor, a Platform as a Service (PaaS) vendor, an Infrastructure as a Service (IaaS) vendor.

8. The system of claim 6, wherein each of the first plurality of technique risk scores is based on a weighted sum including the corresponding subset of a set of policy scores, and wherein each of the second plurality of technique risk scores is based on a weighted sum including the corresponding subset of the set of policy scores.

9. The system of claim 8, wherein the first tactic risk score is based on a weighted sum of the first plurality of technique risk scores, and wherein the second tactic risk score is based on a weighted sum of the second plurality of technique risk scores.

10. The system of claim 9, wherein the resource risk score is based on a weighted sum including the first tactic risk score and the second tactic risk score.

11. A non-transitory computer-readable medium containing computer-executable instructions that, when executed by a processor, cause the processor to perform a method, the method comprising:
receiving configuration settings from a cloud service resource using an application programming interface;
determining a resource risk score, a first tactic risk score, a first plurality of technique risk scores, a second tactic risk score, and a second plurality of technique risk scores, wherein the resource risk score is based on the first tactic risk score and the second tactic risk score, wherein the first tactic risk score is based on the first plurality of technique risk scores, wherein the second tactic risk score is based on the second plurality of technique risk scores, wherein each of the first plurality of technique risk scores is based on a corresponding subset of a set of policy scores, wherein each of the second plurality of technique risk scores is based on a corresponding subset of the set of policy scores, and wherein each of the set of policy scores is based on compliance of the configuration settings with a corresponding setting; and
selecting a first tactic based on the first tactic risk score being worse than the second tactic risk score, selecting a technique of the first tactic based on the technique corresponding to a worst of the first plurality of technique risk scores, and remediating a configuration setting corresponding to the technique,
wherein each of the first tactic risk score and the second tactic risk score reflects a risk of a corresponding tactic that can be used to attack a resource, and
wherein each of the first plurality of technique risk scores and the second plurality of technique risk scores reflects a risk of a corresponding technique that can be used to perform a corresponding tactic in attacking a resource.

12. The non-transitory computer-readable medium of claim 11, wherein the resource is a cloud service of one of a Software as a Service (SaaS) vendor, a Platform as a Service (PaaS) vendor, an Infrastructure as a Service (IaaS) vendor.

13. The non-transitory computer-readable medium of claim 11, wherein each of the first plurality of technique risk scores is based on a weighted sum including the corresponding subset of a set of policy scores, and wherein each of the second plurality of technique risk scores is based on a weighted sum including the corresponding subset of the set of policy scores.

14. The non-transitory computer-readable medium of claim 13, wherein the first tactic risk score is based on a weighted sum of the first plurality of technique risk scores, and wherein the second tactic risk score is based on a weighted sum of the second plurality of technique risk scores.

15. The non-transitory computer-readable medium of claim 14, wherein the resource risk score is based on a weighted sum including the first tactic risk score and the second tactic risk score.

* * * * *